United States Patent [19]

Ward

[11] Patent Number: 4,777,614

[45] Date of Patent: Oct. 11, 1988

[54] DIGITAL DATA PROCESSOR FOR MATRIX-VECTOR MULTIPLICATION

[75] Inventor: Jeremy S. Ward, Great Malvern, England

[73] Assignee: National Research and Development Corporation, London, England

[21] Appl. No.: 800,691

[22] Filed: Nov. 22, 1985

[30] Foreign Application Priority Data

Dec. 19, 1984 [GB] United Kingdom ............... 8431925

[51] Int. Cl.$^4$ .......................................... G06F 15/347
[52] U.S. Cl. ................................................... 364/754
[58] Field of Search ............... 364/754, 725, 757–760, 364/728, 726

[56] References Cited

U.S. PATENT DOCUMENTS

| 4,493,048 | 1/1985 | Kung et al. | 364/754 |
| 4,533,993 | 8/1985 | McCanny et al. | 364/200 |
| 4,639,857 | 1/1987 | McCanny et al. | 364/200 |
| 4,698,751 | 10/1987 | Parvin | 364/200 |

FOREIGN PATENT DOCUMENTS

| 2144245 | 2/1985 | United Kingdom | 364/754 |
| 2147721 | 5/1985 | United Kingdom | |

OTHER PUBLICATIONS

Urquhart and Wood 645 G.E.C. Journal of Research 2 (1984), No. 1, Rugby, Great Britain.

"Index Mappings for Multidimensional Formulation of the DFT and Convolution", Burrus, IEEE Transactions on Acoustics, Speech and Signal Processing, vol. ASSP-25, No. 3, Jun. 1977, pp. 239–242.

"On Computing the Discrete Fourier Transform", Winograd, Mathematics of Computation, vol. 32, No. 141, Jan. 1978, pp. 175–199.

"Two's Complement Pipeline Multipliers", Lyon, IEEE Transactions on Communications, Apr. 1976, pp. 418–425.

Primary Examiner—Gary V. Harkcom
Assistant Examiner—Tan V. Mai
Attorney, Agent, or Firm—Stevens, Davis, Miller & Mosher

[57] ABSTRACT

A digital data processor for matrix-vector multiplication is provided, and comprises a systolic array of bit level, synchronously clock activated processing cells each connected to its row and column neighbours. On each clock cycle, each cell mutiplies an input bit of a respective vector coefficient by a respective matrix coefficient equal to $+1$, $-1$ or 0, and adds it to cumulative sum and carry input bits. Input vector coefficient bits pass along respective array rows through one cell per clock cycle, Contributions to matrix-vector product bits are accumulated in array columns. Input to and output from the array is bit-serial, word parallel, least significant bit leading, and temporally skewed. Transforms such as the discrete Fourier transform may be implemented by a two-channel device, in which each channel contains two processors of the invention with an intervening bit serial multiplier. Processors of the invention may be replicated to implement multiplication by larger matrices.

6 Claims, 7 Drawing Sheets

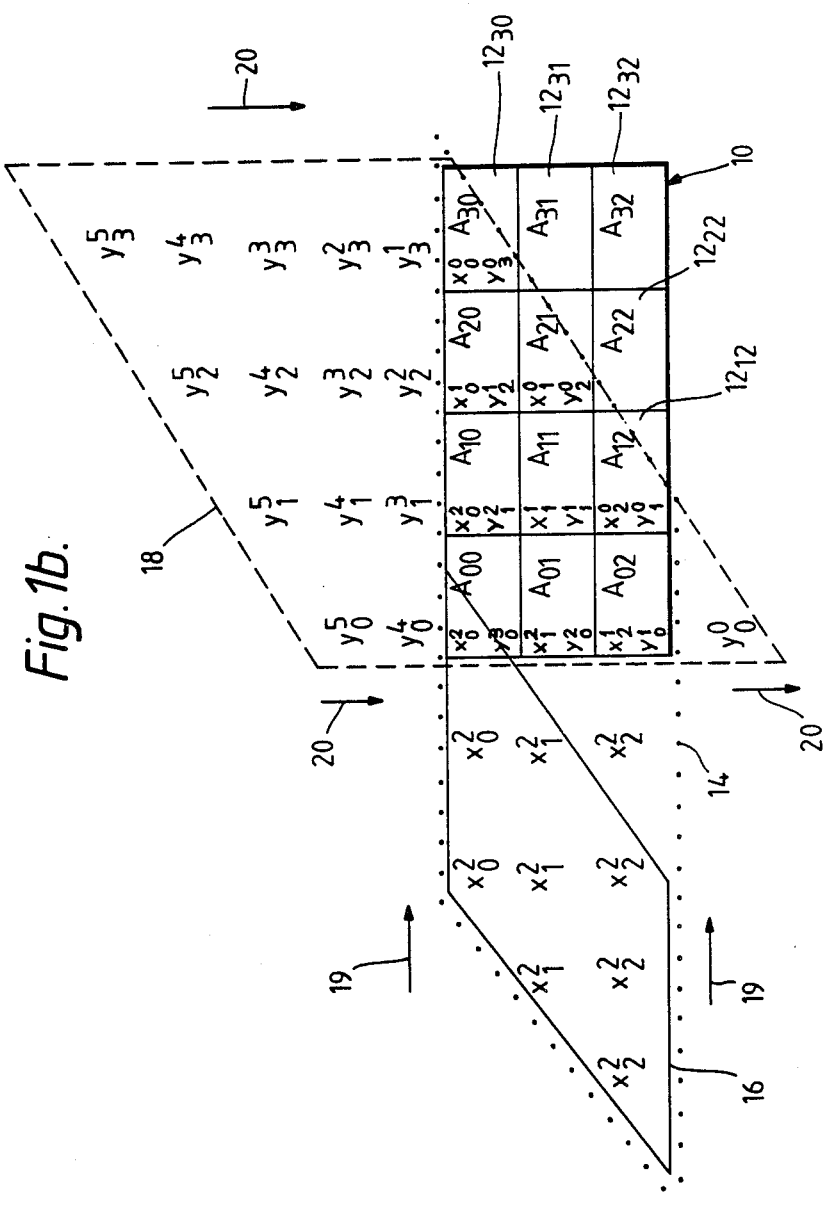

DIGITAL DATA PROCESSOR FOR MATRIX-VECTOR MULTIPLICATION

This invention relates to a digital data processor for matrix-vector multiplication. More particularly, the invention relates to a systolic array of bit level processing cells arranged for both parallel and pipelined operation. The invention also extends to composite processors involving combinations of processors of the invention with other devices, these being arranged for the performance of more complex calculations.

Systolic arrays of bit-level processing cells are known. Published British Patent Application No. 2,106,287A equivalent to U.S. Pat. Nos. 4,533,993 and 4,639,857 (Ref 1) describes two dimensional arrays of bit level grated full adders for carrying out the following calculations:

(1) vector-vector or number-number multiplication,
(2) matrix-vector multiplication,
(3) correlation, and
(4) convolution.

British Patent Application No. 8326690 filed Oct. 5, 1983 published as No. 2,147,721A and equivalent to U.S. Ser. No. 651,312, now U.S. Pat. No. 4,701,876. (Ref 2) relates to systolic arrays similar to those of Ref 1, but arranged for improved utilisation of array processing capacity.

Refs 1 and 2 illustrate the basic characteristics of systolic arrays of logic cells. Such an array comprises relatively simple logic cells each connected only to neighbouring cells and clocking means. Bit-level input data passes from cell to cell through the array, the cumulative sum output bits emerge from respective output cells normally at an array edge. The output bits result from logic operations cascaded through the array. Data input timing, cell logic function, array internal connection scheme and clock signal timing in combination dictate the form of the calculation performed by the array. Other than clocking means, no external control device or computer programme is required.

The Ref 1 device suffers from the disadvantage that full cell utilisation is not achieved. On each processing cycle, half or more of the cells are computing zero terms, ie are effectively idle. Ref 2 provides a remedy by employing an array output accumulator arranged to sum non-simultaneously computed array output contributions to individual bits of each calculation term. This provides a factor of two improvement in cell utilisation efficiency. Moreover, efficiency may be further improved by employing a fairly complex data input scheme in which data moves in adjacent pairs of array rows of cells on alternative clock cycles.

The Ref 2 processor is arranged to avoid restrictions on the word length of terms involved in the relevant calculation. It can accommodate for example matrix-vector multiplication with both vector and matrix coefficients of any bit length. In achieving this, it pays the price of being comparatively complex. There are however a number of calculations for whichit is only required to multiply input data words by $+1$, $-1$ or 0, and avoidance of any restrictions on calculation term length is not wholly necessary.

It is an object of the present invention to provide a digital data processor suitable for multiplication of a vector by a matrix having coefficients $+1$, $-1$ or 0, the processor being of simplified construction compared to the prior art.

The present invention provides a digital data processor for multiplying an input vector having multibit coefficients by a matrix having coefficients $+1$, $-1$ and 0 to provide a product vector, and wherein:

(1) the processor includes an array of clock activated processing cells each associated with a respective matrix coefficient and having a row and column position in the array corresponding to the matrix transpose;

(2) each cell is arranged to perform a two's complement arithmetic operation upon clock activation, the operation comprising:
 (a) receiving input of a cumulative sum bit, a vector coefficient bit and a recirculated carry bit from a prior computation,
 (b) generating an output carry bit and an output cumulative sum bit corresponding to addition of the input sum and carry bits to the product of the vector coefficient bit with the respective cell coefficient, and
 (c) outputting the vector coefficient bit and the output cumulative sum bit and recirculating the output carry bit;

(3) interconnection lines connect each cell to its row and column neighbours as appropriate for vector coefficient bits to propagate along rows and cumulative sum generation to be cascaded down columns;

(4) clock activated data input latch means are arranged to input vector coefficients to respective rows bit serially, least significant bit leading in a temporal skewed manner as appropriate for cumulative sum generation cascaded down each array column to produce respective product vector coefficients bit serially; and (5) clock signal means are arranged to activate the processing cells and data input latch means to effect bit input to each array row and cell operation cyclically.

The processor of the invention provides a number of advantages over prior art matrix-vector multipliers. It requires only one input word stream, whereas the prior art of Refs (1) and (2) employs two counter-propagating input streams. Each processing cell is capable of operating on each clock activation cycle, and blank or zero bits interspersed with input and output bits are unnecessary, these being a feature in the prior art. Furthermore, complex data input and output accumulation arrangements as in Ref (2) are not required, 100% cell utilisation efficiency being available without these. The processor of the invention is restricted to matrices of coefficients $+1$, $-1$ or 0, but in this context is highly efficient and much simpler than prior art devices. Furthermore, matrices of this kind have very important applications in for example discrete Fourier transform (DFT) computation, as will be described.

The processor of the invention may incorporate cells arranged to receive input flag bits synchronously with vector input bits, the flag bit indicating whether or not the respective input bit is a least significant bit (lsb); each cell presets carry input bits for lsb computations to 1 or 0 according respectively to whether or not the respective cell coefficient is $-1$. This provides a particularly convenient way of implementing two's complement arithmetic. Cells may also be arranged to receive two additional input bits indicating an array output multiplier coefficient of $+1$, $-1$ or 0. The processor may be arranged to multiply a vector by a composite matrix built up from first and second sub-matrices having coefficients +1, −1 and 0. In this embodiment, the processor includes an array of sub-array processors each arranged to multiply by the first sub-matrix and a respective array coefficient consisting of a second sub-matrix coefficient, the sub-arrays being located in the array in positions corresponding to the transpose of coefficients of the second sub-matrix.

In a preferred embodiment, the processor includes an array having N rows and M columns, the array column outputs are connected to respective channels of an M channel bit serial multiplier, and the multiplier output is connected as input to at least one second array having M rows and N columns but otherwise being equivalent to the N×M array. This provides a processing channel for implementing a transform. the processor may include two such processing channels to accommodate real and imaginary parts of vector words, the bit-serial multipliers having output cross-connections between processing channels to implement multiplication by imaginary coefficients. In order that the invention might be more fully understood, embodiments thereof will now be described, by way of example only, with reference to the accompanying drawings, in which:

FIGS. 1a and 1b are schematic illustrations of a processor of the invention on the first and fourth cycles of operation;

Figure 1A:
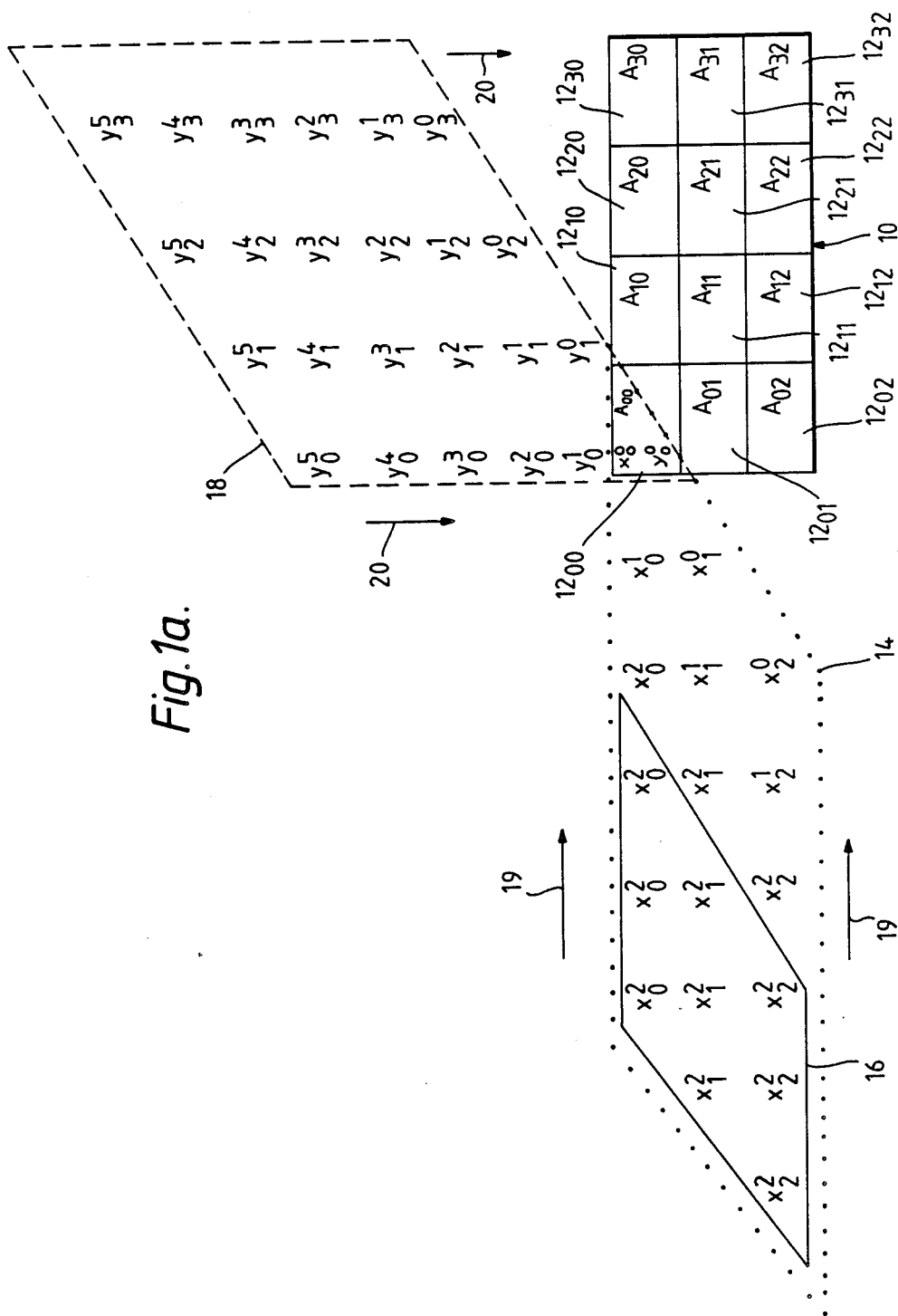

Referring to FIGS. 1a and 1b, in which like features are like referenced, there is shown a matrix-vector multiplication array 10 of bit level processing cells 12 on the first and fourth cycles of operation. The cells 12 are illustrated schematically as rectangles. The array 10 has three rows and four columns; ie it is a 3×4 array incorporating twelve cells 12. Each cell reference numeral 12 has a respective pair of subscripts indicating its row and column position, cell $12_{ij}$ being the ith cell in the jth row where i=0 to 3 and j=0 to 2. Each cell $12_{ij}$ is associated with a respective coefficient $A_{ij}$ for multiplying input data bits, where $A_{ij}$=+1, −1 or 0. Following Ref (2), data input and result generation are hereinafter described with reference to a data parallelogram 14 incorporating a so-called guard band 16, and to a result parallelogram 18. The parallelograms 14 and 18 move to the right and downwards respectively, as indicated by arrows 19 and 20, at a like rate of one cell per clock cycle.

Figure 2:
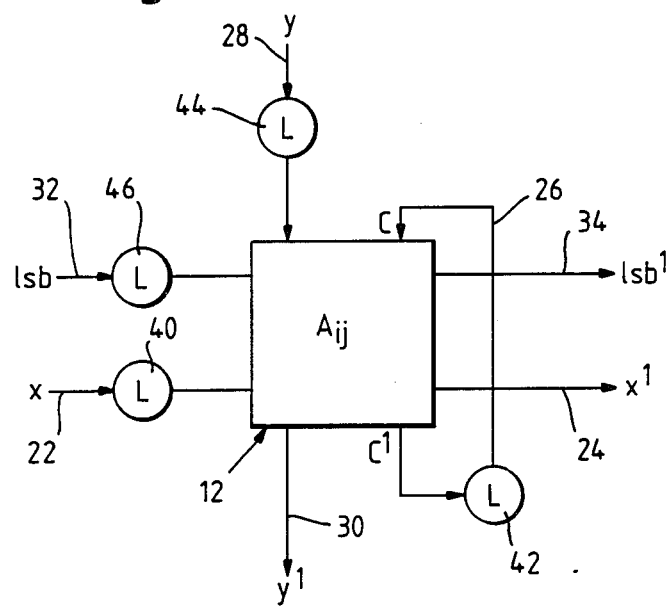
FIG. 2 shows a processing cell as employed in the FIG. 1a and 1b processor.

Referring now also to FIG. 2, there is shown a bit-level processing or logic cell 12 in more detail. The cell 12 has x, x' or data input and output lines 22 and 24, c, c' or carry recirculation line 26 and y, y' or cumulative sum input and output lines 28 and 30. The presence or absence of a prime superscript to x, c etc indicates a cell output or input bit respectively. Input least significant bit flags indicated by pass along a flag lsb' input line 32 and output least significant bit flags indicated by lbs' pass along a a ring input line 34. The lines 22, 26, 28 and 32 contain one clock cycle delay latches 40, 42, 44 and 46 respectively.

The logic function of each cell 12 is given by:

$$x' \leftarrow x \quad (1.1)$$

$$lsb' \leftarrow lsb \quad (1.2)$$

$$y' \leftarrow y \oplus D \oplus R \quad (1.3)$$

$$c' \leftarrow (y \cdot D) + (y \cdot R) + (D \cdot R) \quad (1.4)$$

where all terms in Expressions (1.1) to (1.4) are one-bit quantities, R=x, $\bar{x}$ or 0 for $A_{ij}$=+1, −1 or 0 respectively, and D is equal to the lsb input flag value if $A_{ij}$=−1, and to the carry input ANDed with the lsb input flag complement otherwise; ie $D = \{lsb \cdot (A_{ij} = -1) + (lsb \cdot c)\}$.

Each cell $12_{ij}$ forms a product $A_{ij}x_j^k$ on the $(1+i+j+k)$th cycle of array operation. Here $x_j^k$ is the kth bit of the jth input data word $X_j$, as will be described. The product $A_{ij}x_j^k$ is added to the prior cumulative sum bit y input on line 28 and to the carry bit c on line 26. The result becomes the new cumulative sum bit y' output to a neighbouring cell immediately below. Input lsb flag and x (or $x_j^k$) bits are passed on to a right hand neighbouring cell. A new carry bit c' is generated and recirculated through latch 42 for addition to the subsequent product of $A_{ij}x_j^{k+1}$ to be formed on the next cycle.

Forming products $A_{ij}x_j^k$ is straightforward if $A_{ij}$ is +1 or 0, but more complex if $A_{ij}$=−1. The latter requires bits to be complemented and 1 to be added to the lsb. Accordingly, when $A_{ij}$=−1, the incoming $x_j^k$ is complemented to form $A_{ij}x_j^k$. In addition, when $A_{ij}$=−1 and the lsb input flag is true, ie 1, 1 is added as input carry bit c to $A_{ij}x_j^k$. The lsb input flag has the value 1 only when an lsb $x_j^0$ is input to the relevant cell $12_{ij}$, and this value passes from cell to cell across the array 10 in synchronism with lsb movement.

Each of the latches 40, 42, 44 and 46 comprises first and second half latches in series controlled by respective phases of a two-phase, non-overlapping clock. On a first phase signal, a latched bit is clocked out of the processing cell 12. The corresponding output bit passes to the first half latch of a neighbouring cell, or, in the case of carry recirculation latch 42, to its own first half latch. On a second phase signal, each bit is clocked from a first to a second half latch ready for the next processing cycle. These clocking arrangements are well known in the art and will not be described in detail. A fuller description is available in inter alia Ref 1.

The array 10 operates as follows. Each cell 12 receives input bits from above and from its left, and furnishes output bits below and to its right. Cells $12_{00}$ to $12_{02}$ in the left hand column of the array 10 receive x and lsb flag input bits from data input means (not shown). Top row cells $12_{00}$ to $12_{30}$ receive y input bits permanently set to 0 for most calculations. These bits could of course be initialised to non-zero values of required. Right hand column cells $12_{30}$ to $12_{32}$ have unconnected data and lsb' flag output lines 24 and 34. Bottom row cells $12_{02}$ to $12_{32}$ have cumulative sum or y' output lines leading out of the array 10 and providing respective bits of a calculation result. Other than the foregoing, all connections from each cell are to its immediate neighbours only. This is indicated schematically in FIG. 1 by the array illustration of cell rectangle boundaries common to neighbouring cells. Accordingly, general cell $12_{ij}$ receives lsb/x and y input bits from cells $12_{(i-1)j}$ and $12_{i(j-1)}$ respectively, and furnishes output bits lsb'/x' and y' to cells $12_{i'1)j}$ and $12_{i(j+1)}$ respectively.

The $3 \times 4$ cell array 10 is arranged for performing the calculation:

$$\underline{Y} = A\underline{X} \quad (2)$$

where: A is a $4 \times 3$ matrix having coefficients $A_{ji}$ of $\pm 1$ or 0, $i=0$ to 3 and $j=0$ to 2; each coefficient being associated with a respective cell $12_{ij}$; as indicated by the transposition of indices i and j in $A_{ji}$, the matrix A is in fact the transpose of the array coefficients $A_{ij}$; $\underline{X}$ is a vector having three coefficients or binary words $X_0$, $X_1$ and $X_2$ each of three bits, where word $X_a$ has bits $x_a^b$ and b=0 to 2; and $\underline{Y}$ is a product vector having four coefficients or binary words $Y_0$ to $Y_3$ each of six bits, where word $Y_a$ has bits $y_a^b$ and b=0 to 3.

Data indicated by parallelogram 14 is input to the array 10 in a word parallel, bit serial, lsb leading manner ie word $X_a$(a=0 to 2) having bits $x_a^b$(b=0 to 2) is input from the left lsb leading to the ath row of cells 12 of the array 10, cells $12_{0a}$ to $12_{3a}$. Input of $X_a$ leads input of $X_{a+1}$ by one cell processing cycle or one bit; ie $x_a^b$ is input to the ath row one cycle earlier than input of $x_{a+1}^b$ to the (a+1)th row. This is referred to as bit-staggered or temporally skewed input. The time stagger is cumulative down the array 10, as indicated by the oblique sides of data parallelogram 14. The data input time stagger is effected in order to achieve correct timing of array operation, as will be described. Each bit $x_a^b$ moves through one cell per cycle of array operation; this is represented in FIGS. 1 and 2 by parallelograms 14 and 18 moving respectively to the right and downwards through the array 10 by one cell per cycle.

In order that the array 10 might execute the Equation (2) calculation, it is necessary to compute product vector coefficients of the form $Y_i$ given by the word level summation:

$$Y_i = \sum_{j=0}^{n} A_{ij}X_j, \text{ where } n = 2 \text{ for the three coefficients of } X. \quad (3)$$

Moreover, each bit of $X_j$ in Equation (3) must be multiplied by $A_{ij}$. The bth bit $y_i^b$ of $Y_i$ is given by:

$$y_i^b = lsb \sum_{j=0}^{2} A_{ij}x_j^b + \text{carry bit from} \quad (4)$$

$(b - 1)$th bit summation or from two's complementation.

FIG. 1a corresponds to the first cycle of array operation, in which the leading or upper right vertex of data parallelogram 14 has entered cell $12_{00}$. This corresponds to input on line 22 (see FIG. 2) of the lsb $x_0^0$ of $X_0$ to cell $12_{00}$, which also receives an lsb input flag or logic 1 on line 32.

On the fourth cycle of array operation shown in FIG. 1b, data parallelogram 14 and accompanying guard band 16 have moved three cells 12 to the right as compared to FIG. 1a. Result parallelogram 18 has moved down three cells so that its lowermost vertex is below the array 10. This corresponds to output of $y_0^0$ from the array 10. Data and result parallelograms 14 and 18 encompass all cells 12 other than $12_{22}$, $12_{31}$ and $12_{32}$ at the lower right. This illustrates array operation. Those areas of parallelogram overlapping the array correspond to current cell computations. Parallelogram areas above and to the left of the array correspond to future computations, and those below and to the right of the array to past computations.

On the second clock cycle, cell $12_{01}$ receives a cumulates sum input bit consisting of the zeroth bit of $[A_{00}x_0^0+\text{carry bit}]$ from cell $12_{00}$ above the the lsb $x_1^0$ of $X_1$ from the left. The cumulative sum or y output from cell $12_{01}$ is the zeroth bit of $[A_{00}x_0^0+A_{01}x_1^0+\text{carry bit}]$. A carry bit recirculates via carry latch $42_{01}$ for addition to a summation by cell $12_{01}$ on the third clock cycle. Similarly, cell $12_{02}$ produces the zeroth bit of $[A_{00}x_0^0+A_{01}x_1^0+A_{02}x_2^0+\text{carry bit}]$ as a cumulative sum output after the third clock cycle, which is output from the array 10. By comparison with Equation (4), this output is the zeroth bit of lsb of $Y_0$, $y_0^0$. It is accordingly demonstrated that the first three cycles of array operation produce $y_0^0$ as the output of cell $12_{02}$.

Turning now to the second column of cells $12_{10}$, $12_{11}$ and $12_{12}$, these respectively receive input of $x_0^1$, $x_1^0$ and $x_2^0$ on the second, third and fourth cycles of array operation. this produces output of the zeroth bit of $A_{10}x_0^0+A_{11}x_1^0+Z_1x_2^0+\text{carry bit}$ from cell $12_{12}$ after the fourth cycle in a manner similar to that described for the first column of cells. The lsb of $Y_1$, $y_1^0$, is accordingly provided. In the general case, the lsb $y_i^0$ of the of the nth product vector coefficient $Y_i$ is output from cell $12_{12}$ after (i+3) cycles of operation. It will be appreciated that the carry bits in the expressions described only arise from $A_{ij}-1$, since $y_i^0$ cannot be associated with carry bits from lower order bit computations.

On the second, third and fourth cycles of array operation, first column cells $12_{00}$, $12_{01}$ and $12_{02}$ receive input of second lsbs $x_0^1$, $x_1^1$ and $x_2^1$ respectively. Cell $12_{00}$ provides a cumulative sum output of $[A_{00}x_0^1+\text{carry bit}]$, the carry arising from its prior calculation of $A_{00}x_0^0$, and recirculates a further carry bit. Cell $12_{01}$ subsequently provides an output of the second lsb of $[A_{00}x_0^1+A_{01}x_1^1+\text{carry bit}]$, the carry arising from its prior calculation of $[A_{00}x_0^0+A_{01}x_1^0]$. Cell $12_{02}$ then provides the second lsb of $[A_{00}x_0^1+A_{01}x_1^1+A_{02}x_2^1+\text{carry bit}]$, the carry arising from its prior calculation of $[A_{00}x_0^0+A_{01}x_1^0+A_{02}X_2^0]$. The cell $12_{02}$ output after the fourth cycle is the second lsb $y_0^1$ of the zeroth product vector coefficient $Y_0$. Extending this analysis as before demonstrates that the bit of bth significance $y_i^b$ of the ith product vector coefficient $Y_i$ emerges from cell $13_{i2}$ after (i+b+3) cycles of operation, in accordance with Equation (4). It is implicit in this that product vector coefficients $y_i$ emerge from the array 10 in a bit serial, word parallel, bit staggered fashion, with one cycle delays between output of both adjacent bits of a coefficient and bits of equal significance of adjacent words. Output timing may be inferred from the oblique upper and lower sides of result parallelogram 18. The array 10 accordingly performs the computation $\underline{Y}=A\underline{X}$ of Equation 2.

From the foregoing analysis, it will be seen that the time stagger or temporal skew applied to the input vector X allows accumulation of terms down a column of cells on successive cycles. The product or result parallelogram 18 in effect moves down the array 10 through one cell per cycle, and product coefficients emerge from the array lsb leading. Carry bits remain at respective cells, so that in effect they propagate up the downwardly moving result parallelogram 18 giving rise to higher order bits of product words. It will be appreciated that parallelograms 14 and 18 do not have physical significance, but constitute a graphical aid to understanding array operation.

The function of guard band 16 is as follows. In any digital arithmetic circuit provision must be made for output terms having greater bit length than input data. In the present case, each output word or product matrix coefficient $y_i$ arises from the sum of products of three bit words with three coefficients having the equivalent of two bits. It can be shown that the maximum bit length of a product coefficient $Y_i$ under these circumstances is six bits. The last three bits arise from carry bits from lower order computations. The guard band 16 provides three bits replicating the respective most significant or sign bit to follow each data word $X_j$ into the array 10, so that the input word length is extended to the maximum of that for $Y_i$. This allows computation of all bits of the product vector Y to be completed before any further vector X is input for a subsequent calculation. The use of guard bands is discussed in detail in Ref 2.

Figure 3:
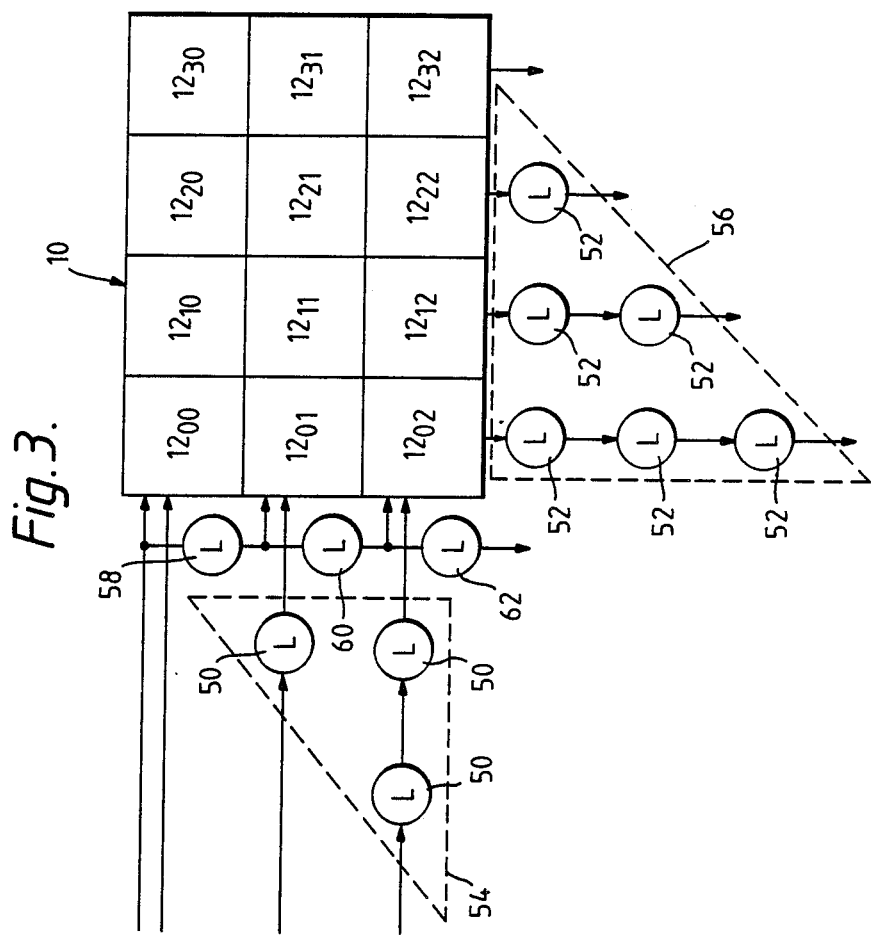
FIG. 3 shows latch arrangements for temporally skewing processor input data, deskewing output data and supplying lsb flags.

Referring now to FIG. 3, there is shown an arrangement of latches 50 and 52 for temporally skewing array input data and deskewing output product terms. The jth row of the array 10 receives input of data bits via j latches 50 (j=0, 1 or 2) each imposing a one processing cycle delay. Output from the ith column of the array 10 is fed via (3−i) latches 52 (i=0, 1, 2 or 3). The latches 50 and 52 are equivalent to those described with reference to FIG. 2, and are controlled by the same two-phase clock.

The latches 50 and 52 provide input skewing and output deskewing indicated by surrounding triangles 54 and 56 respectively. It can be seen that the deskewing delay of (3−i) clock cycles applied to the ith column output brings output of lsbs $y_0^0$ to $y_2^0$ into synchronism with that of $y_3^0$, and the same applies to higher order bits. In general, an N×M array of cells would require j latches in series with the jth row input and (M−i−1) latches in series with the ith column output, where j=0 to (N−1) and i=0 to (M−1).

FIG. 3 also shows a convenient means of supplying an lsb flag to all left hand column cells of the array 10. The lsb input of cell $12_{00}$ is connected via a latch 58 to the lsb input of cell $12_{01}$, itself connected to the lsb input of cell $12_{02}$ via a further latch 60. The lsb output from the array passes via a latch 62. The latches 58, 60 and 62 are equivalent to latches 50 and 52. An lsb flag input to cell $12_{00}$ is accordingly input to cell $12_{01}$ one cycle later, to cell $12_{02}$ two cycles later, and is output from the array 10 three cycles later. With this arrangement, it is necessary only to flag the input of an lsb to the upper left hand cell $12_{00}$.

Whereas the description referring to FIGS. 1, 2 and 3 relates to a 3×4 array of cells, it will be apparent that an array of any size can be constructed by increasing the number of cells. In general, an N×M array may be constructed from NM cells 12 for multiplying a vector of N coefficients by an M×N matrix to form a product vector of M coefficients.

Figure 4:
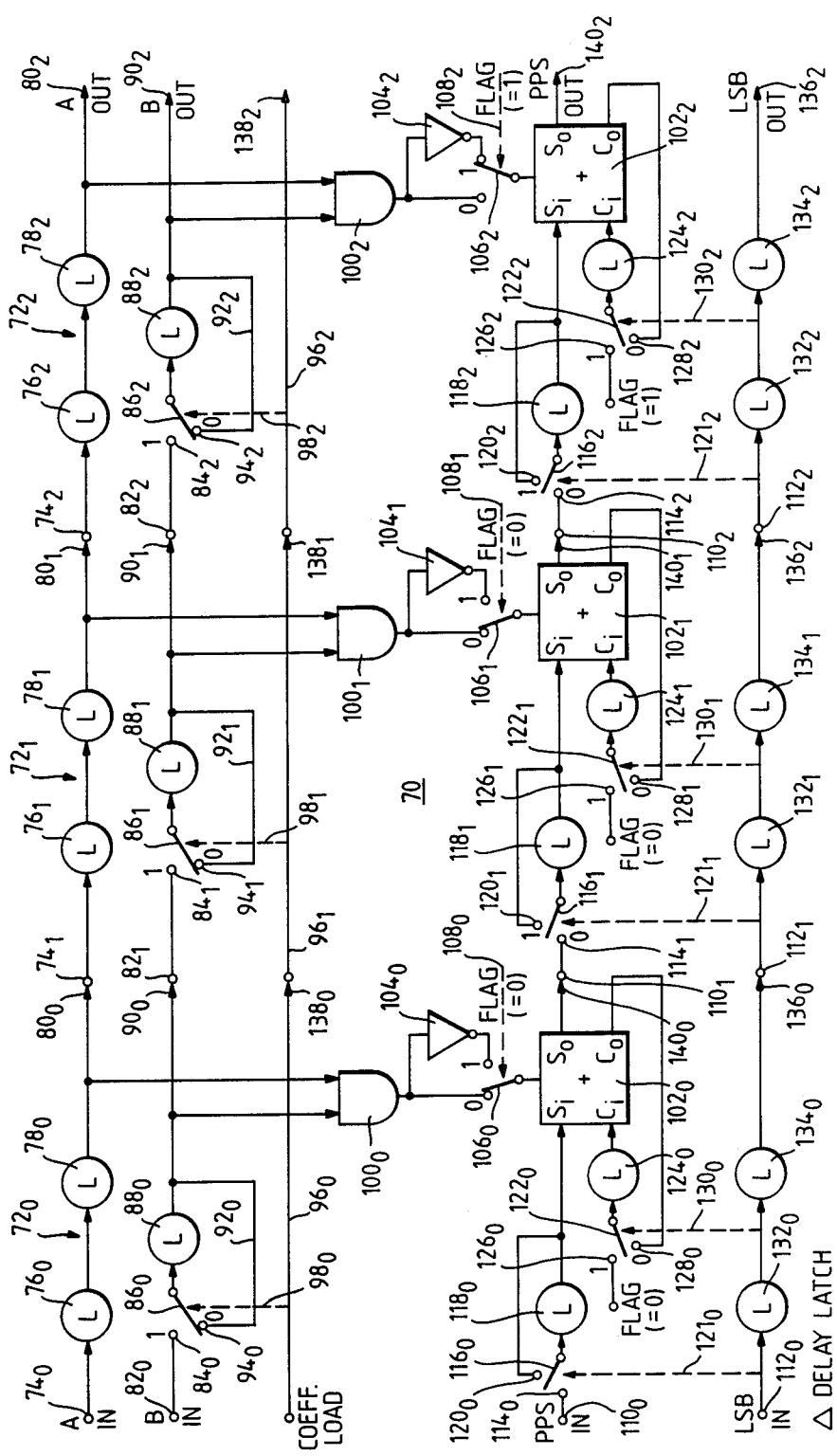
FIG. 4 shows a bit serial multiplier for multiplying processor output.

Referring now to FIG. 4, there is shown a bit-serial multiplier 70 for use inter alia in conjunction with an array such as array 10. The multiplier 70 has three equivalent sections $72_0$, $72_1$ and $72_2$ in series for multiplication of input binary numbers by the least, second and most significant bits (lsb, ssb and msb) of a three bit number. Each multiplier section 72 has a mutliplicand or A input 74 connected via first and second latches 76 and 78 to an output 80. In the drawing, suffixes n=0, 1 or 2 are applied to features 72, 74 etc to identify the multiplier section to which the feature belongs. In the following description, the suffix is given when a particular feature is referred to, but omitted when referring to all like-referenced features. Each section also has a multiplier coefficient or B input 82 connected to a first terminal 84 of a two-way switch 86, itself connected via a latch 86 to a B output 90. A line 92 connects the output of latch 88 to a second terminal 94 of switch 86. The position of switch 86 is controlled by the signal on a coefficient load line 86, as indicated by a chain-line arrow 98.

Coefficient load signals 1 and 0 connect switch 86 via terminals 84 and 94 respectively. Output signals from latches 78 and 88 are fed to an AND gate 100. The output of AND gate 100 is fed to a one-bit full adder 102 either directly or via an inverter 104 in accordance with the position of a two-way switch 106. Switch position is controlled by a flag signal as indicated by a chain line arrow 108. The inverter 104 is implemented if this flag signal is 1.

Each multiplier section 72 has a partial product sum (PPS) input 110 and an lsb flag input 112. PPS input 110 is connected to a first terminal 114 of a two-way switch 116 itself connected as input to a latch 118. The output of latch 118 is connected both to a second terminal 120 of switch 116 and as a sum input $S_i$ to full adder 102. The switch 116 is connected via its first or second terminal 114 or 120 according respectively to whether the lsb input flag at input 112 is 0 or 1. Control of switch 116 position is indicated by chain line arrow 121. A carry input or $C_i$ to full adder 102 is connected to a switch 122 via a latch 124. The switch 122 connects latch 124 either to a first terminal 126 providing a flag signal, or to a second terminal 128 connected to the carry output $C_0$ of adder 102. The position of switch 122 is controlled as indicated by chain line arrow 130 by the lsb flag signal from input 112 after delay by a latch 132. The lsb flag values 1 and 0 connect switch terminals 126 and 128 respectively to latch 124. The lsb flag signal passes via a second latch 134 to a flag output 136. Each section 72 has a coefficient load output 138 and a PPS output 140, the latter connected to the $S_0$ or sum output of adder 102.

The three-bit multiplier 70 operates as follows. It is arranged to implement the "shift and add" algorithm proposed by R F Lyon in "Two's Complement Pipeline Multipliers", IEEE Transactions on Communications, April 1976, pp 418–425 (Ref 3). Ref 3 sets out the procedure in arithmetic logic terms for multiplying together a pair of two's complement binary numbers. As the theory is available in Ref 3, only the basic procedure will be given. The rules for multiplication of a pair of two's complement numbers are as follows:

(1) the multiplicand is multiplied by the multiplier to form respective partial products for summation;
(2) each partial product is sign extended to a respective msb one bit greater in significance than that produced by multiplying the msbs of the multiplicand and multiplier together; ie each partial product sign bit is replicated;
(3) the greatest or most significant partial product (mspp) is one's complemented;
(4) 1 is added to the mspp;
(5) the partial products are summed:
(6) bits of lower significance than the lsb of the mspp are ignored; and (7) the carry bit from summation of the partial product msbs is ignored.

Rules (1) to (7) above are implemented by the multiplier 70 as follows. A three bit multiplier coefficient is loaded in series msb leading into B input $82_0$. The signal on coefficient load line 96 is set to 1, so two way switches $86_0$ to $86_2$ are connected (not as shown) to respective first terminals $84_0$ to $84_2$. All latches illustrated in FIG. 4, such as latches $88_0$ to $88_2$ apply a one clock cycle delay. The latches are controlled by a two phase system clock as described for the array 10. Operation of this clock for three clock cycles locates the multiplier lsb, ssb and msb in latches $88_0$, $88_1$ and $88_2$ respectively. The signal on coefficient load line 96 is then set to 0, thereby connecting switches $86_0$ to $86_2$ to respective second terminals $94_0$ to $94_2$. Operation of the system clock subsequently circulates each multiplier bit through a respective latch 88 via line 94 on each clock cycle, thus providing the relevant AND gate 100 with a respective multiplier input bit repetitively.

The multiplier 70 is preset in accordance with Rule (3) above by applying flag signals 0, 0 and 1 respectively to switches $106_0$, $106_1$ and $106_2$. This implements inverter $104_2$ only, inverters $104_0$ and $104_1$ being left unconnected. It corresponds to inversion or one's complementing of the greatest partial product, since multiplier section $72_2$ multiplies by the multiplier msb previously loaded therein. Rule (4) is implemented by applying permanent flag signals of 0, 0 and 1 to first switch terminals $126_0$, $126_1$ and $126_2$. This provides for a $C_i$ of 1 to the msb multiplier section $72_2$ when the lsb flag value output from latch $132_2$ is 0. All bit values in latches, adders and AND gates are initially 0, and the multiplier 70 is ready for operation.

A multi-bit multiplicand is input to A input $74_0$ bit serially, lsb leading and one bit per clock cycle. PPS input $114_0$ is permanently set to 0. In synchronism with lsb input on a first clock cycle, an lsb flag value 1 is input at $112_0$. These bits are latched at $76_0$ and $132_0$ respectively. The lsb flag connects switch $116_0$ to its second terminal $120_0$ to provide for subsequent recirculation of the bit (initially 0) latched at $118_0$ and its input as $S_i$ to adder $102_0$. The output of AND gate 100 and the bits latched at $124_0$ and $118_0$ are all 0 at time t=0. $S_i$, $C_i$ and the multiplication result inputs to adder $102_0$ are then all zero on the first clock cycle, and $S_0$ and $C_0$ for this adder are also zero.

On the second clock cycle, the multiplicand lsb passes to latch $78_0$. The lsb flag value 1 passes to latch $134_0$ connecting switch $122_0$ via its first terminal $126_0$, thus providing for a 0 input to latch $124_0$. The lsb flag value at input 112 has changed to 0 and become latched at $132_0$. The switch $116_0$ has accordingly become connected via its first terminal $114_0$. This connects PPS input $114_0$ (permanently 0) to latch $118_0$, which latches the value 0. As on the first clock cycle, all inputs to and outputs from adder $102_0$ are zero. The second clock cycle also effects input of the second lsb or ssb of the multiplicand at $74_0$ and its loading into latch $76_0$.

On the third clock cycle, the multiplicand lsb is clocked out of latch $78_0$, and passes to second section latch $76_1$ whilst providing an input to AND gate $100_0$. The value 1 recirculating on latch $88_0$ via line $92_0$ provides a second AND gate input bit. The product formed at AND gate $100_0$ output passes directly to adder $102_0$ bypassing inverter $104_0$. Adder receives a sum input $S_i$ consisting of the PPS input at $110_0$ (permanently 0) latched at $118_0$ on the previous clock cycle. A carry input $C_i$ is also received equal to that latched at $124_0$ on the previous cycle; ie $C_i$ on clock cycle 3 is equal to $C_0=0$ on clock cycle 2 when lsb flag value 1 connected switch $122_0$ to its second terminal $128_0$. Since $S_i=$PPS at $110_0=0$, $C_i=C_0=0$ on cycle 2, the cycle 3 output $S_0$ of adder $102_0$ is the product of the multiplicand lsb and $72_0$ section multiplier bit 1, and $C_0$ is 0.

The third clock cycle also effects output of the multiplicand ssb from latch $76_0$ for latching at $78_0$, and the multiplicand tsb (third least significant bit) is received by latch $76_0$. Each multiplicand bit and lsb flag value is delayed by two latches per multiplier section 72, whereas latch 124 provides a one cycle delay to $C_i$. This ensures that a carry bit is always added to a product bit one cycle later and accordingly one level higher in bit significance. However, a multiplicand lsb product will be associated with a zero carry bit from an earlier cycle. Against this, Rule (4) must be implemented, and is achieved by setting the carry flag to 1 at first switch terminal $126_2$ in most significant multiplier section $72_2$. Carry flags are 0 at first switch terminals $126_0$ and $126_1$. Accordingly, 1 is added to the product of the most significant multiplier bit with the multiplicand lsb in response to an lsb flag of 1 at switch $122_2$ one cycle earlier. Products of multiplier bits of lower significance with the multiplicand lsb are added to $C_i$ values provided by 0 carry flags. This also implements Rule (7), since in a series of numbers being multiplied the lsb flag of each number will override the carry bit from the preceding computation in providing the current $C_i$.

The implementation of Rules (3), (4) and (7) have been mentioned. Implementation of Rules (1) and (5)—partial product formation and summation—is apparent from the preceding description. Rules (2) and (6) are implemented by the switch 116/latch 118 combinations as follows: latch 118 contains on any clock cycle either firstly its previous cycle contents or secondly the previous cycle PPS input at 114, according to whether the previous cycle lsb flag at input 112 was 1 or 0 respectively. The second alternative relates to normal partial product computation. The first alternative however corresponds to sign extension of a partial product by replicating its msb. Moreover, replication repeated as appropriate is provided for, since an lsb flag takes two clock cycles to traverse a cell from input 112 to output 136 as against one clock cycle for a partial produce from 114 to 140. Accordingly, a partial product sign extended by msb replication in multiplier section $72_1$ for example would have the appropriate timing to receive a second sign extension bit at section $72_2$. This implements Rule (2).

Furthermore, in addition to sign bit replication, connection of switch 116 to second terminal 120 for one cycle means that the current partial produce input bit at 110 is lost. This bit is the lsb of the subsequent partial product, so its loss implements Rule (6).

It will be apparent that the multiplier 70 will multiply a multiplacand of arbitrary bit length. Moreover, arbitrary bit length multipliers may be employed by using the appropriate number of multiplier sections 72.

In order that the operation of the multiplier 70 might be more fully appreciated, Table 1 sets out values of the parameters $A_{in}$, $L_{in}$, $LSB_{in}$, $P_{in}$, $S_i$, $C_i$, $S_0$ and $C_0$ for ten successive cycles of operation. $L_{in}$ is the input bit to each latch 118 from each switch 116, and $P_{in}$ is the product bit at each switch 106 input to adder 102. Other parameters are as previously defined and shown in FIG. 4. Table 1 illustrates multiplier 70 calculating successive two's complement products (1) 1100×101, (2) 1110×101 and (3) 00×101; Product (1) is decimal −4×−3, and the result 0011 or +12 is given by the values of $S_0$ in Section $72_2$ on cycles 6 to 10. The results of Products (2) and (3) (not shown) would be given by $S_0$ in Section $72_2$ on cycles 11 to 14 and 15 to 18 respectively.

triangles 184 and 186. The latch arrays 180 to 186 are similar to those described with reference to FIG. 3, except that a maximum of (N−1) skewing latches and (M−1) deskewing latches are employed.

The FIG. 5 arrangement implements the WFTA as follows. This Fourier transform algorithm is described by S Winograd in "On Computing the Discrete Fourier

TABLE 1

SUCCESSIVE LOGIC VALUES AT POINTS IN BIT-SERIAL MULTIPLIER 70 OVER TEN CYCLES OF OPERATIONS
Example of Successive Product Formation Product (1):  1100 × 101    Multiplicand 101 is prelatched at $86_0$, $86_1$ and $86_2$
followed by Product (2):  1110 × 101
followed by Product (3):  00 × 101

| Cycle Number | Section $72_0$ | | | | | | | | Section $72_1$ | | | | | | | | Section $72_2$ | | | | | | | |
|---|---|---|---|---|---|---|---|---|---|---|---|---|---|---|---|---|---|---|---|---|---|---|---|---|
| | $A_{in}$ | $L_{in}$ | $LSB_{in}$ | $P_{in}$ | $S_i$ | $C_i$ | $S_o$ | $C_o$ | $A_{in}$ | $L_{in}$ | $LSB_{in}$ | $P_{in}$ | $S_i$ | $C_i$ | $S_o$ | $C_o$ | $A_{in}$ | $L_{in}$ | $LSB_{in}$ | $P_{in}$ | $S_i$ | $C_i$ | $S_o$ | $C_o$ |
| 1 | 0 | | 1 | | | | | | | | | | | | | | | | | | | | | |
| 2 | 0 | 0 | 0 | | | | | | | | | | | | | | | | | | | | | |
| 3 | 1 | 0 | 0 | 0 | 0 | 0 | 0 | 0 | 0 | | 1 | | | | | | | | | | | | | |
| 4 | 1 | 0 | 0 | 0 | 0 | 0 | 0 | 0 | 0 | 0 | 0 | | | | | | | | | | | | | |
| 5 | 0 | 0 | 1 | 1 | 0 | 0 | 1 | 0 | 1 | 1 | 0 | 0 | 0 | 0 | 0 | 0 | 0 | | 1 | | | | | |
| 6 | 1 | 0 | 0 | 1 | 0 | 0 | 1 | 0 | 1 | 1 | 0 | 0 | 1 | 0 | 1 | 0 | 0 | 1 | 0 | | | | | |
| 7 | 1 | 0 | 0 | 0 | 0 | 0 | 0 | 0 | 0 | 1 | 1 | 0 | 1 | 0 | 1 | 0 | 1 | 1 | 0 | 1 | 1 | 1 | 1 | 1 |
| 8 | 1 | 0 | 0 | 1 | 0 | 0 | 1 | 0 | 1 | 1 | 0 | 0 | 1 | 0 | 1 | 0 | 1 | 1 | 0 | 1 | 1 | 1 | 1 | 1 |
| 9 | 0 | 0 | 1 | 1 | 0 | 0 | 1 | 0 | 1 | 1 | 0 | 0 | 1 | 0 | 1 | 0 | 0 | 1 | 1 | 0 | 1 | 1 | 0 | 1 |
| 10 | 0 | 0 | 0 | 1 | 0 | 0 | 1 | 0 | 1 | 1 | 0 | 0 | 1 | 0 | 1 | 0 | 1 | 1 | 0 | 0 | 1 | 1 | 0 | 1 |

NOTES:
(a) $L_{in}$ is the input bit to latch 118 from switch 116.
(b) $P_{in}$ is the Product bit at switch 106 input to adder 102 from AND gate 100 routed directly or as appropriate via inverter 104.
(c) The result of Product 1,0011 (= +12 with lsb and second lsb truncated) is generated as $S_o$ in Section $72_2$ on cycles 6,7,8 and 9.
(d) The results of Products 2 and 3 (not shown) would be generated as $S_o$ in Section $72_2$ on cycles 11 to 14 and 15 to 18 respectively.

Figure 5:
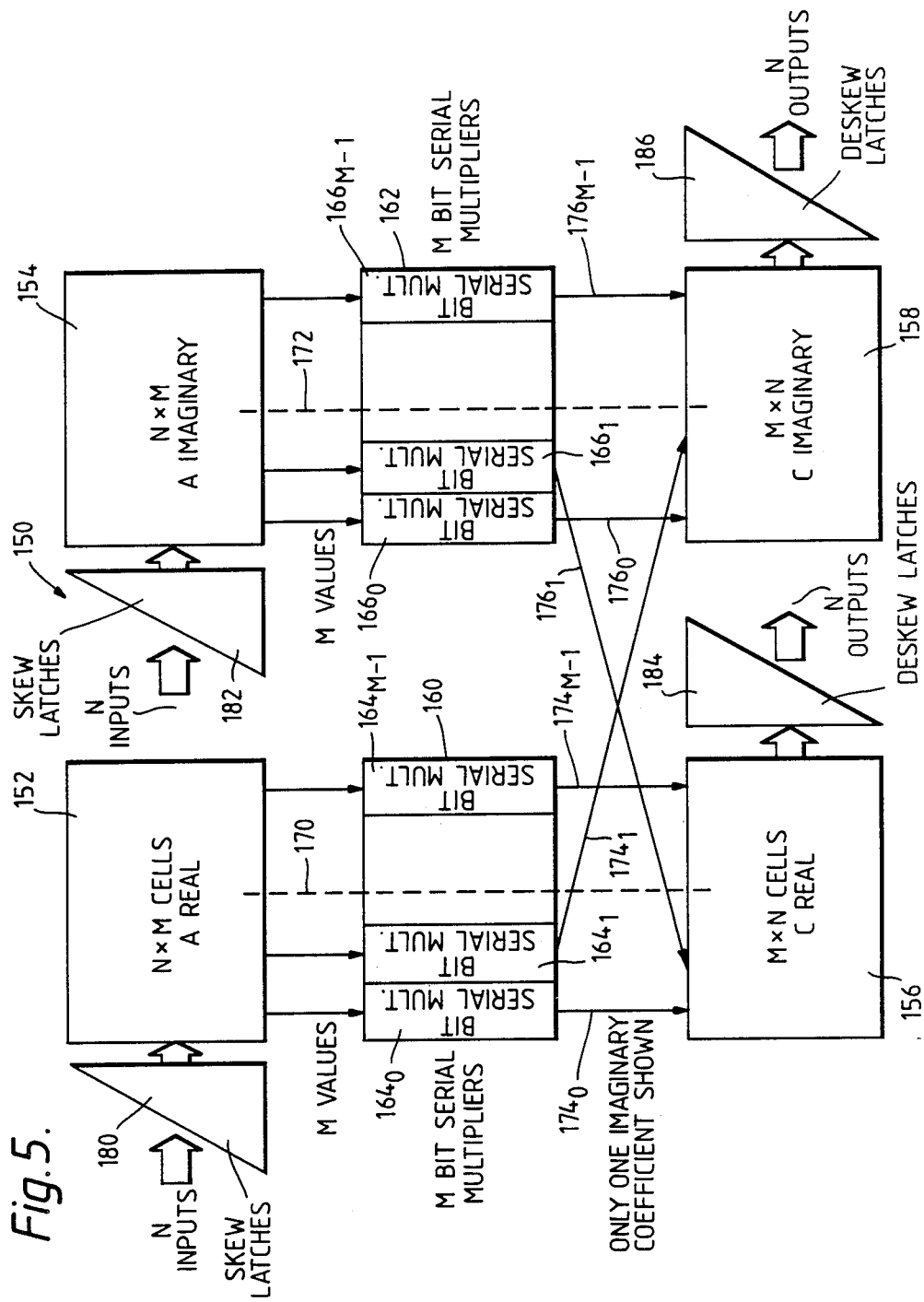
FIG. 5 shows a processor of the invention arranged to perform a Winograd Fourier transform algorithm.

Referring now to FIG. 5, there is shown a further processor 150 of the invention arranged for performing the Winograd Fourier transform algorithm (WFTA). The processor 150 incorporates two N×M arrays 152 and 154 together with two M×N arrays 156 and 158 where N≧M. Each of the arrays 152 to 158 is similar to the array 10.

Bit serial multipliers 160 and 162 respectively receive M output products from arrays 152 and 154 and multiply them by a set of stored coefficients to provide M inputs to arrays 156 and 158. The multipliers 160 and 162 have M channels $164_0$ to $164_{M-1}$ and $166_0$ to $166_{M-1}$ respectively, of which only the first two and the last channels are illustrated in either case. The respective multiplier coefficient in any one of channels 164 or 166 may be either real or imaginary, but not complex. All coefficients are arranged to be of equal length to preserve throughput timing. Channels $164_0$, $164_{M-1}$, $166_0$ and $166_{M-1}$ contain real coefficients and channels $164_1$ and $166_1$ imaginary coefficients in the present example. Each of the channels 164 and 166 is a bit serial multiplier similar to that set out in FIG. 4, but with the number of multiplier sections equal to the number of coefficient bits.

Arrays 152 and 156 together with multiplier 160 define a so-called real processing channel indicated by chain line 170 for producing real output coefficients. Similarly, arrays 154 and 158 with multiplier 162 define an imaginary processing channel indicated by chain line 172. As indicated by arrows $174_0$, $174_{M-1}$, $176_0$ and $176_{M-1}$, real multiplier coefficients produce outputs remaining in the same real or imaginary processing channel 170 or 172. Oblique arrows $174_1$ and $176_1$ indicate multiplication by imaginary coefficients and consequent transfer of products between channels. N respective inputs of data words are applied to the arrays 152 and 154 via respective temporal skewing latch arrays indicated by triangles 180 and 182. N respective outputs of product words pass bit serially from the arrays 156 and 158 to deskewing latch arrays indicated by inverted Transform", Mathematics and Computation, January 1978, Volume 32, No. 141, pp 175-199 (Ref 4). It provides for a discrete Fourier transform (DFT), expressed by $(Y_0, Y_1, \ldots Y_{N-1})$, of a sequence of N complex data points $(y_0, y_1, \ldots y_{N-1})$ to be written in the form:

$$Y = C(Ay \times Bz) \qquad (5)$$

where:

Y is the vector of N coefficients $Y_0$ to $Y_{N-1}$;
y is the vector of N coefficients or data points $y_0$ to $y_{N-1}$;
A is an M×N matrix;
C is an N×M matrix;
Bz is a precalculated product expressed as a set of M fixed coefficients, each of which is either real or imaginary but not complex.

The implementation of the WFTA employing numerical techniques consists of the following steps:

(1) multiplying the vector y of N complex input data values by an M×N matrix A having coefficients +1, −1 or 0 only, yielding M complex first product values;
(2) multiplying each product from (1) by a respective coefficient either real or imaginary to form M complex second product values;
(3) multiplying the second products from (2) by an N×M matrix C having coefficients +1, −1 or 0 to yield third products consisting of N complex output terms providing the DFT.

Each data word or coefficient of y is divided into real and imaginary parts for processing in the real and imaginary channels 170 and 172 respectively. Each word part is input in synchronism lsb leading to latch array 180 or 182 (as appropriate) providing the necessary temporal skew, as described with reference to FIG. 3. The skewed data is multiplied by the A matrix in array 152 and 154 as previously described with reference to FIG. 1. First product terms are output from the arrays 152 and 154 in a word parallel, bit serial, lsb leading format, the data skew being preserved. Product word bits and flag values indicating lsb position are passed from array bottom row cells (cells $12_{02}$ to $12_{32}$ in FIG. 1) to respective channels $164_0$ to $164_{M-1}$ or $166_0$ to $166_{M-1}$ of the multiplier 160 or 162 as appropriate. Each array column is accordingly associated with a respective multiplier channel.

Each multiplier channel multiplies its respective bit serial input first product stream by a preloaded coefficient as described with reference to FIG. 4. If any channel of either multiplier is associated with an imaginary multiplier coefficient, its output is fed across to the neighbouring processing channel as described previously. Otherwise, multiplier channel products remain in the same processing channel. In either case, the second product output from the ith channel of multiplier 160 or 162 is fed to the ith column of array 156 or 158 as appropriate. Both ith channels of the two multipliers will be like-coupled to the relevant array for all $i=0$ to $M-1$; ie either both or neither of the ith multiplier channels are cross-coupled to a neighbouring processing channel.

Output product bits and lsb flag values pass to the arrays 156 and 158, which respectively multiply real and imaginary channel product words by the C matrix as previously described for matrix A. Outputs from the arrays 156 and 158 are deskewed in latch arrays 184 and 186 respectively. This produces N third product terms from each array provided bit serially, lsb leading and in synchronism. Accordingly, the outputs from latch arrays 184 and 186 respectively provide the real and imaginary parts of the DFT $\underline{Y}$ or $Y_0$ to $Y_{N-1}$, where the value $Y_i$ emerges from the ith rows of the arrays 156 and 158.

Whereas FIG. 5 relates to a two channel device, it is an alternative to provide a single channel for processing all real data will all real multiplier coefficients. Such a device might apply a cosine transform to compress television signals for example. As has been said, matrix-vector multiplier arrays of any size may be constructed merely by employing a rectangular array with the appropriate number of cells. However standardisation is an important consideration in integrated circuit design. It is desirable to have as few standard components as possible. In particular, it would be valuable to be able to build up large arrays from standard small array integrated circuits or chips. This will now be described.

It is a property of the WFTA (see Ref 4) that longer transforms can be produced from a set of algorithms for shorter transforms. Given WFTAs for $N_1$ and $N_2$ data points, where $N_1$ and $N_2$ are relatively prime, then a WFTA of $N_1N_2$ points has the form:

$$Y=(C_2 \oplus C_1)[(A_2 \oplus A_1)yx(B_2 \oplus B_1)z] \quad (6)$$

where $\oplus$ indicates a Kronecker product and the subscript $_1$ or $_2$ to A, B or C indicates association with the $N_1$ or $N_2$ point algorithm respectively.

Equation (6) has the same form as Equation (5) except that:

(1) A is replaced by $(A_2 \oplus A_1)$;
(2) B is replaced by $(B_2 \oplus B_1)$; and
(3) C is replaced by $C_2 \oplus C_1$ Replacement of B merely requires a larger multiplier coefficient set, ie $M_1M_2$ instead of M coefficients.

Replacement of A and C produces an $(M_1M_2 \times N_1N_2)$ matrix and an $(N_1N_2 \times M_1M_2)$ matrix respectively. As an example, the Kronecker product $E \oplus F$ of two matrices E and F having coefficients $e_{ij}$ ($i=0$ to $N_1-1$, $j=0$ to $M_1-1$), $f_{ij}$ ($i=0$ to $N_2-1$, $j=0$ to $M_2-1$) is, with E as the innermost factor, a matrix K given by:

$$K = \begin{bmatrix} f_{00}E & f_{10}E & \cdots & f_{(N_2-1)0}E \\ f_{01}E & \ddots & & \vdots \\ \vdots & & \ddots & \vdots \\ f_{0(M_2-1)}E & \cdots & & f_{(N_2-1)(M_2-1)}E \end{bmatrix} \quad (7)$$

From Equation (7), it can be seen that K is produced by replicating the innermost factor matrix E, multiplying it in each case by the appropriate coefficient $f_{ij}$, and locating it in K as indicated by the indices i and j of $f_{ij}$. Accordingly, having transforms or matrices and multiplier coeffcients for $N_1$ and $N_2$ points, a transform for $N_1N_2$ points can be constructed. In each case the A and C matrices either have coefficients of $+1$, $-1$ and 0 or can be modified to this form.

Figure 6:
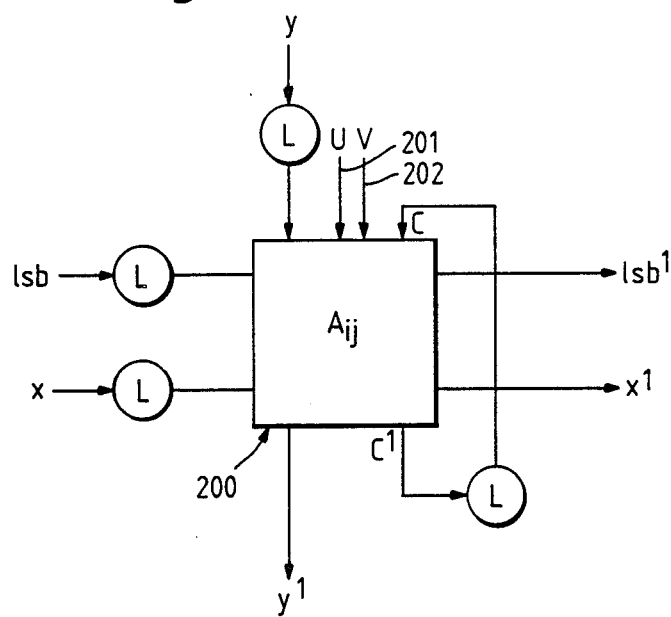
FIG. 6 shows a processing cell arranged for multiplying processor output by a further coefficient.

The 3×4 array 10 of FIG. 1 (corresponding to 4×3 matrix A) may be replicated to provide sub-arrays for the purposes of creating a larger matrix-vector multiplier. The resulting array of sub-arrays would correspond to the transpose of K in Equation (7). However, it is necessary to provide for each nested or replicated sub-array to be multiplied by the appropriate coefficient to form the equivalent of $f_{ij}E$ in each case. This may conveniently be achieved by a modification to each cell shown in FIG. 6. A cell 200 is shown having all the features of cell 12 in FIG. 2 with the addition of two further one-bit inputs 201 and 202 from above. The inputs 201 and 202 are preset with bits (u,v) indicating the coefficient 0, 1 or $-1$ by which the sub-array output is to be multiplied. The coefficients 0, 1 and $-1$ are represented by (u,v) values (0,0), (0,1) and (1,0) respectively. The cell multiplying coefficient then becomes $A_{ij}*$ where $A_{ij}*=A_{ij}.(u,v)$. Cell operation is then equivalent to that previously described with $A_{ij}*$ replacing $A_{ij}$; since both $A_{ij}*$ and $A_{ij}$ have values $+1$, $-1$ or 0, this corresponds merely to coefficient rearrangement.

An array of cells 200 is suitable for use as a building block or sub-array for producing large matrix-vector multipliers for Fourier transform computations as previously indicated. However, it should be noted that input to an array of such sub-arrays is not as straight forward as for an array 10. Multidimensional mapping of data and result words is involved in a way which is different for the input and output sequences. Mappings are implemented in pairs, a suitable pair being Lexicographical mapping and Chinese Remainder Theorem mapping. Forms of mapping are discussed by C S Burrus in IEEE Trans., 1977, ASSP-25 pp 239-242. The effect of such mapping is to provide a first scheme for input of data words to the array of sub-arrays, and a second scheme indicating how result words are arranged in the array output. The array 10 was arranged for input of data word $X_j$ to row j, and output of $Y_i$ from column i. However, the mapping requirement changes this.

For a 12×12 array of 3×4 sub-arrays, Lexicographical mapping gives, for input to array rows 0 to 11, $X_0$, $X_3$, $X_6$, $X_9$, $X_4$, $X_7$, $X_{10}$, $X_1$, $X_8$, $X_{11}$, $X_2$ and $X_5$ respectively. The Chinese Remainder Theorem gives the output scheme $Y_0$, $Y_9$, $Y_6$, $Y_3$, $Y_4$, $Y_1$, $Y_{10}$, $Y_7$, $Y_8$, $Y_5$, $Y_2$, $Y_{11}$ for words output from array columns 0 to 11 respectively. Rearranging these input/output schemes to provide for words $X_0$ to $X_{11}$ and $Y_0$ to $Y_{11}$ to appear in parallel merely requires rearrangement of lines to and from skewing and deskewing latches respectively.

Figure 7:
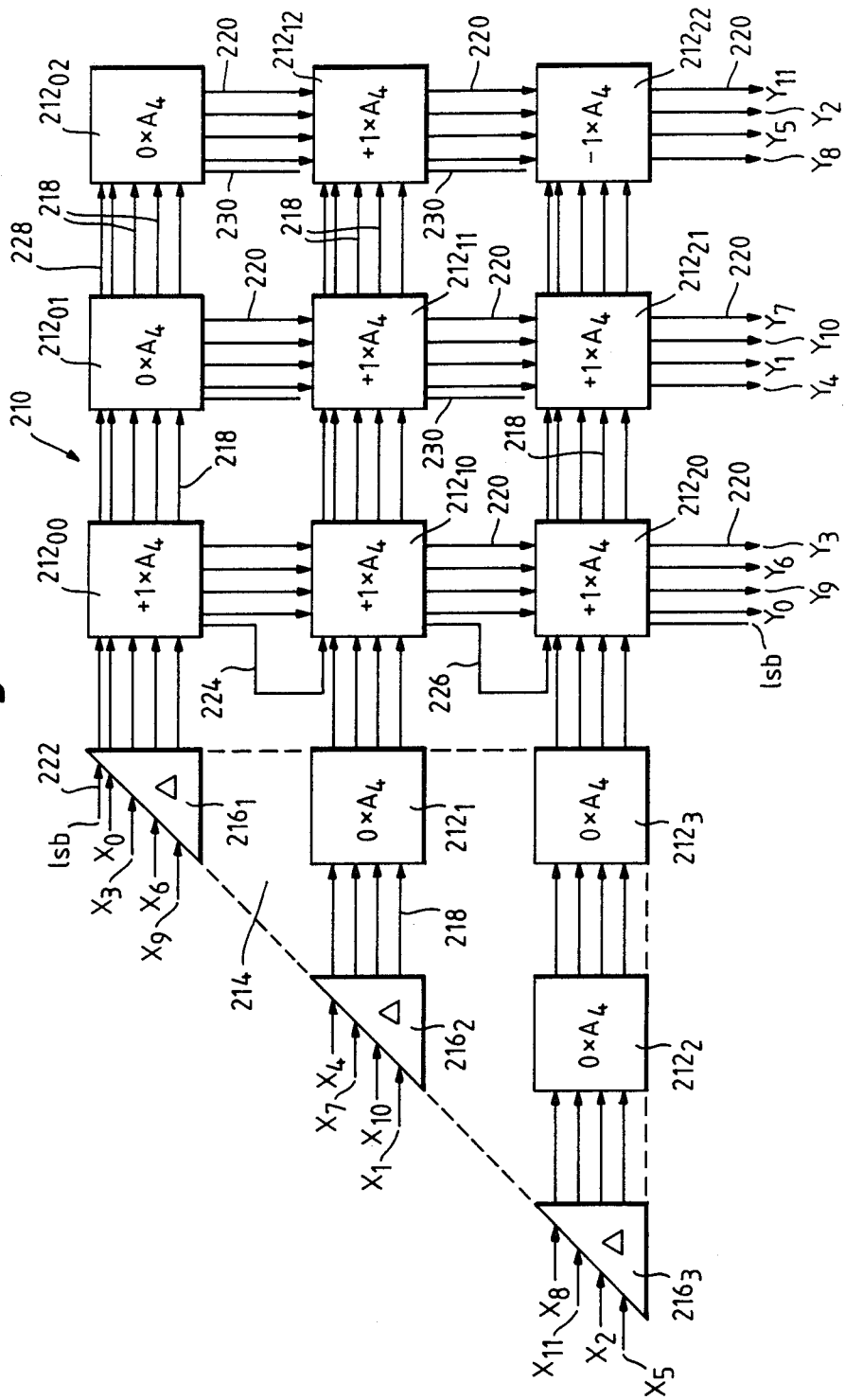
FIG. 7 shows a processor of the invention constructed as an array of sub-processors or sub-arrays.

Referring now to FIG. 7, there is shown a $12 \times 12$ matrix-vector multiplier array 210 built up from nine $4 \times 4$ or $A_4$ sub-arrays $212_{00}$ to $212_{33}$. A data skewing array 214 is provided by three triangular latch arrays $216_1$ to $216_2$ and three further $A_4$ sub-arrays $212_1$ to $212_3$. Data throughput is indicated by horizontal arrows such as 218, and communication of computed results down and out of array 210 by vertical arrows such as 220.

The $A_4$ sub-arrays 212 each implement vector multiplication by a $4 \times 4$ matrix $A_4$ appropriate for a four point DFT, where the transpose superscript $\sim$ indicates that matrix $A_4$ has coefficients which are transposed with respect to the multiplier coefficients of each sub-array. $A_4$ is given in Ref 4 by:

$$\widetilde{A_4} = \begin{bmatrix} 1 & 1 & 1 & 1 \\ 1 & -1 & 1 & -1 \\ 1 & 0 & -1 & 0 \\ 0 & 1 & 0 & -1 \end{bmatrix} \quad (8)$$

Equation 8 yields the cell coefficient positions in $A_4$ by transposition:

| 1 | 1 | 1 | 0 |
|---|---|---|---|
| 1 | -1 | 0 | 1 |
| 1 | 1 | -1 | 0 |
| 1 | -1 | 0 | -1 |

Ref 4 also gives $A_3$, a $3 \times 3$ matrix for a three point DFT:

$$A_3 = \begin{bmatrix} 1 & 1 & 1 \\ 0 & 1 & 1 \\ 0 & 1 & -1 \end{bmatrix} \quad (9)$$

Transposing Equation 8 gives the $A_3$ coefficient positioning:

| 1 | 0 | 0 |
|---|---|---|
| 1 | 1 | 1 |
| 1 | 1 | -1 |

As indicated in Equation (6), the product matrix $A_{12}$ is constructed by replicating the matrix $A_4$, and multiplying each replica by and locating in accordance with a respective coefficient of $A_3$. The resulting sub-array $A_{12}$ is the transpose of $A_{12}$, and is given by replicating $A_4$ with positioning and multiplicative coefficients from Equation (9). It can be seen that array 210 is constructed in this manner. Multiplicative coefficients are implemented by (u,v) cell inputs as described previously.

The triangular latch arrays $216_1$ to $216_3$ are equivalent to those described with reference to FIG. 5. The $A_4$ arrays $212_1$ to $212_3$ provide the additional delays necessary between input to successive rows of sub-arrays. Multiplication by 0 or (u,v) input of (0,0) together with zero-connected sub-array cumulative sum inputs renders a sub-array equivalent to an array of latches, there being one latch per cell for transfer of input data bits to the right. Clearly, this could be implemented as an array of latches instead of processing cells both in the skewing circutry and in the array 210. However, this would require an unnecessary third device, whereas FIG. 7 embodiment is implemented with only two forms of device.

It is assumed for the purposes of FIG. 7 that each $A_4$ sub-array $212_{00}$ to $212_{33}$ incorporates a chain of lsb flag latches (not shown) equivalent to latches 58 in FIG. 3. An lsb flag input 222 is provided to upper left sub-array $212_{00}$, and connections 224 and 226 are provided for onward transfer of the flag down the left hand column of the array 210. Each sub-array $212_{ij}$ passes on the lsb flag to its right hand neighbouring sub-array $212_{(i+1)j}$ as indicated for example by lsb flag connection 228 between sub-arrays $212_{01}$ and $212_{02}$. It is however unnecessary to connect lsb flag outputs between sub-array rows for sub-arrays in the middle and right hand columns of the array 210. As indicated at 230 for example, such outputs are left unconnected.

I claim:

1. A digital data processor for multiplying an input vector having multibit coefficients by a matrix having coefficients $+1$, $-1$ and 0 to provide a product vector, and wherein:

(1) the processor includes an array of clock activated processing cells each associated with a respective matrix coefficient and having a row and column position in the array in accordance with the position of respective coefficient in the matrix transpose;

(2) each cell is arranged to perform a two's complement arithmetic operation upon clock activation, the operation comprising:
  (a) receiving input of a cumulative sum bit, a vector coefficient bit and a recirculated carry bit from a prior computation,
  (b) generating an output carry bit and an output cumulative sum bit resulting from addition of the input sum and carry bits to the product of the vector coefficient bit with the respective cell coefficient, and
  (c) outputting the vector coefficient bit and the output cumulative sum bit and recirculating the output carry bit;

(3) interconnection lines connect each cell to its row and column neighbours as appropriate for vector coefficient bits to propagate along rows and cumulative sum generation to be cascaded down columns;

(4) clock activated data input means are arranged to input vector coefficients to respective rows bit serially, least significant bit (lsb) leading in a temporally skewed manner as appropriate for cumulative sum generation cascaded down each array column to produce respective product vector coefficients bit serially; and (5) clocking means are arranged to activate the processing cells and data input means and effect bit input to each array row and cell operation cyclically.

2. A digital data processor according to claim 1 wherein each cell is arranged to receive a respective input flag bit in synchronism with each vector input bit, the flag bit indicating whether or not the respective input bit is an lsb, and wherein each cell is arranged to preset carry bits input to lsb computations to 1 or 0 according respectively to whether or not the respective cell coefficient is −1.

3. A digital data processor according to claim 2 wherein the cells are arranged to receive two additional input bits indicating an array output multiplier coefficient of +1, −1 or 0 and to produce an array output equal to the product vector multiplied by that coefficient.

4. A digital data processor for multiplying a vector by a composite matrix built up from first and second sub-matrixes both having coefficients +1, −1 or 0, the processor including an array of sub-array processors each arranged to multiply by the product of the first sub-matrix with a respective second sub-matrix coefficient, the sub-arrays being located in the array in positions in accordance with their respective coefficients' locations in the transpose of the second sub-matrix, and wherein:
  (1) each sub-array comprises clock-activated processing cells arranged in rows and columns, each cell being associated with a respective first sub-matrix coefficient and having a sub-array row and column position in accordance with the respective coefficient's position in the first sub-matrix transpose,
  (2) the array has rows comprising successive respective sub-array rows and columns comprising successive respective sub-array columns,
  (3) each of said processing cells is arranged to:
    (a) receive input of a cumulative sum bit, a recirculated carry bit from a prior computation, a vector coefficient bit, a flag bit indicating whether or not the vector coefficient bit is a least significant bit, and two additional bits, indicating the respective second sub-matrix coefficient associated with the respective cell's sub-array,
    (b) perform a two's complement arithmetic operation in response to clock activation, the operation comprising generating output carry and cumulative sum bits resulting from addition of the input sum and carry bits to the product of the vector coefficient bit with the respective cell's first sub-matrix coefficient multiplied by the respective sub-array's second sub-matrix coefficient, input carry bits to least significant bit computations being preset to 1 or 0 according respectively to whether or not the respective cell multiples vector coefficient bits by −1,
    (c) output the vector coefficient bit and the output cumulative sum bit and recirculate the output carry bit,
  (4) interconnection lines connect each cell to its array row and array column neighbours as appropriate for vector coefficient bits to propagate along array rows and cumulative sum generation to be cascaded down array columns;
  (5) clpck activated data input means are arranged to input vector coefficients to respective array rows bit serially, least significant bit leading in a temporally skewed manner as appropriate for cumulative sum generation to be cascaded down each array column to produce respective product vector coefficients bit serially; and
  (6) clocking means are arranged to activate the processing cells and data input means to effect bit input to each array row and cell operation cyclically.

5. A digital data processor for implementing a transform, and including a first array for multiplying an input vector having multibit coefficients by a first matrix having coefficients +1, −1 and 0 to form a first product vector, a multi-channel bit serial multiplier arranged to muliply the first product vector by coefficients to produce a second product vector, and a second array arranged to multiply the second product vector by a second matrix having coefficients +1, −1 and 0 to provide the required transform, and wherein:
  (1) the first and second arrays comprise clock activated processing cells arranged in rows and columns forming respectively an N×M first array and an M×N second array,
  (2) the bit serial multiplier is clock activated and has M channels,
  (3) each processing cell is associated with a respective matrix coefficient and is located in its respective array in accordance with its respective coefficient's location in the respective matrix transpose,
  (4) each processing cell is arranged to perform a two's complement arithmetic operation upon clock activation, the operation comprising:
    (a) receiving input of a cumulative sum bit, a vector coefficient bit and a recirculated carry bit from a prior computation,
    (b) generating an output carry bit and an output cumulative sum bit corresponding to addition of the input sum and carry bits to the product of the vector coefficient bit with the respective cell coefficient, and
    (c) outputting the vector coefficient bit and the output cumulative sum bit and recirculating the output carry bit,
  (5) the first and second arrays have row inputs for receiving the input vector and the second product vector respectively and column outputs for providing the first product vector and the transform respectively,
  (6) interconnection lines connect each cell to its row and column neighbours in the respective array as appropriate for vector coefficient bits to propagate along rows and cumulative sum generation to be cascaded down columns to the respective column outputs,
  (7) first array column outputs are connected via respective bit-serial multiplier channels to respective second array row inputs,
  (8) clock activated data input means are arranged to provide coefficients of the input vector to respective first array rows bit serially, least significant bit leading in a temporally skewed manner as appropriate for cumulative sum generation to be cascaded down first and second array columns, and
  (9) clocking means are arranged to activated the processing cells of the first and second arrays, the bit serial multiplier and the first array data input means such that bit input to each first array row and multiplier and processing cell operations take place cyclically.

6. A digital data processor for implementing a transform of an input vector having multibit coefficients each with real and imaginary parts, the processor having a real channel and an imaginary channel for processing real and imaginary vector parts respectively, and wherein:
  (1) each channel includes a respective first array for multiplying input vector parts by a first matrix having coefficients +1, −1 and 0 to form a first product vector part, a respective multi-channel bit serial multiplier to multiply the first product vector parts by coefficients each either real or imaginary but not complex and form second product vector parts, and a second array arranged to multiply real second product vector parts derived from both channels by a second matrix having coefficients +1, −1 and 0 to provide a respective part of the transform, (2) the first and second arrays in each channel comprise like clock activated processing cells arranged in rows and columns forming an $N \times M$ first array and an $M \times N$ second array respectively, (3) each bit-serial multiplier is clock-activated and has M channels, (4) each processing cell is associated with a respective matrix coefficient and is located in its respective array in accordance with its respective coefficient's location in the respective matrix transpose, (5) each processing cell is arranged to perform a two's complement arithmetic operation upon clock activation, the operation comprising:
 (a) receiving input of a cumulative sum bit, a vector coefficient bit and a recirculated carry bit from a prior computation,
 (b) generating an output carry bit and an output cumulative sum bit corresponding to addition of the input sum and carry bits to the product of the vector coefficient bit with the respective cell coefficient, and
 (c) outputting the vector coefficient bit and the output cumulative sum bit and recirculating the output carry bit;

(6) the real channel first and second arrays have row inputs for receiving real input vector parts and real second product vector parts respectively and column outputs for providing real first product vector parts and real transform parts respectively, (7) the imaginary channel first and second arrays have row inputs for receiving imaginary input vector parts and imaginary second product vector parts respectively and column outputs for providing imaginary first product vector parts and imaginary transform parts respectively, (8) interconnection lines connect each cell to its row and column neighbours in the respective array as appropriate for vector coefficient bits to propagate along rows and cumulative sum generation to be cascaded down columns to the respective column outputs, (9) each first array column output is connected via a respective bit serial multiplier channel to a respective second array row input in its own channel or in the other channel in accordance with whether the multiplier channel incorporates a real or an imaginary coefficient,

(10) clock-activated data input means are arranged to provide input vector coefficient parts to rows of each of the first arrays bit serially, least significant bit leading in a temporally skewed manner as appropriate for cumulative sum generation to be cascaded down first and second array columns,

(11) clocking means are arranged to activate the data input means and the processing cells of the arrays and multipliers in both channels such that bit input to each first array row and multiplifer and processing cell operation take place cyclically.

* * * * *